(12) United States Patent
Fujimaki et al.

(10) Patent No.: US 9,043,645 B2
(45) Date of Patent: May 26, 2015

(54) MALFUNCTION ANALYSIS APPARATUS, MALFUNCTION ANALYSIS METHOD, AND RECORDING MEDIUM

(75) Inventors: Ryohei Fujimaki, Tokyo (JP); Hidenori Tsukahara, Tokyo (JP)

(73) Assignee: NEC CORPORATION, Tokyo (JP)

(*) Notice: Subject to any disclaimer, the term of this patent is extended or adjusted under 35 U.S.C. 154(b) by 215 days.

(21) Appl. No.: 13/643,391

(22) PCT Filed: Apr. 26, 2011

(86) PCT No.: PCT/JP2011/060108
§ 371 (c)(1),
(2), (4) Date: Oct. 25, 2012

(87) PCT Pub. No.: WO2011/138911
PCT Pub. Date: Nov. 10, 2011

(65) Prior Publication Data
US 2013/0042148 A1    Feb. 14, 2013

(30) Foreign Application Priority Data
May 6, 2010    (JP) .................................. 2010-106810

(51) Int. Cl.
*G06F 11/07*    (2006.01)
*G05B 23/02*    (2006.01)

(52) U.S. Cl.
CPC ............ *G06F 11/079* (2013.01); *G05B 23/024* (2013.01)

(58) Field of Classification Search
CPC .......................... G06F 11/079; G06F 11/2257
USPC ........................................................ 714/26
See application file for complete search history.

(56) References Cited

U.S. PATENT DOCUMENTS 5,127,005 A * 6/1992 Oda et al. ........................ 714/26
5,369,756 A * 11/1994 Imura et al. ..................... 714/26

(Continued)

FOREIGN PATENT DOCUMENTS

CN    1548286 A    11/2004
CN    1652087 A    8/2005

(Continued)

OTHER PUBLICATIONS

A. Kyriazis et al., "Enhanced Fault Localization Using Probabilistic Fusion With Gas Path Analysis Algorithms", Journal of Engineering for Gas Turbines and Power, Sep. 2009, pp. 051601.1-051601.9, vol. 131.

(Continued)

*Primary Examiner* — Philip Guyton
(74) *Attorney, Agent, or Firm* — Sughrue Mion, PLLC

(57) ABSTRACT

A malfunction analysis apparatus (100) is provided with a malfunction-analysis processor (107), an attribute-extraction processor (108), and an outputter (105). The malfunction-analysis processor (107) obtains a malfunction-contribution degree, which indicates a degree that individual malfunctions (to be called malfunctioning elements, hereafter) contribute to the malfunctioning of the object being analyzed, on the basis of the relative relationship between the data to be analyzed that has, as elements thereof, values generated on the basis of a plurality of indicator values of the object being analyzed, and representative values for the plurality of indicators corresponding to each of the plurality of malfunctions. Then, the malfunctioning elements being generated is specified, on the basis of the obtained malfunction-contribution degree. The attribute-extraction processor (108) specifies, when a malfunctioning is taking place that is a combination of the malfunctioning elements, the indicators that are estimated as the cause of the specified malfunctioning elements, on the basis of the representative values of the plurality of indicators, and the values of each of the elements of the data to be analyzed that was stored. The outputter (105) outputs the specified malfunctioning elements and/or the indicators.

10 Claims, 13 Drawing Sheets

(56) References Cited

U.S. PATENT DOCUMENTS

| | | | |
|---|---|---|---|
| 8,370,108 B2* | 2/2013 | Fujimaki et al. | 702/182 |
| 2005/0114743 A1* | 5/2005 | Moorhouse | 714/100 |
| 2005/0204241 A1 | 9/2005 | Tamakoshi | |
| 2007/0074076 A1* | 3/2007 | Imai et al. | 714/26 |
| 2008/0010522 A1* | 1/2008 | Uwatoko et al. | 714/23 |
| 2013/0042148 A1* | 2/2013 | Fujimaki et al. | 714/37 |

FOREIGN PATENT DOCUMENTS

| | | |
|---|---|---|
| JP | 5-46428 A | 2/1993 |
| JP | 5-151373 A | 6/1993 |
| JP | 2005-257416 A | 9/2005 |
| JP | 2006023051 A | 1/2006 |
| JP | 2007-328645 A | 12/2007 |
| JP | 2009301341 A | 12/2009 |
| JP | 2010092355 A | 4/2010 |

OTHER PUBLICATIONS

Jun-Ichi Takeuchi et al., "A Unifying Framework for Detecting Outliers and Change Points from Time Series", IEEE Transactions on Knowledge and Data Engineering, Apr. 2006, pp. 1-11, vol. 18, No. 4.

Yoichi Fukuchi et al., "VRM (Vehicle Relationship Management) Solution for a Safe and Comfortable Automobile Society", 2005, pp. 1-4.

International Search Report for PCT/JP2011/060108 dated May 31, 2011.

Communication dated Apr. 18, 2014 from the State Intellectual Property Office of People's Republic of China in counterpart Application No. 201180022767.9.

Communication dated Feb. 10, 2015, issued by the Japan Patent Office in corresponding Japanese Application No. 2012-513806.

* cited by examiner

FIG.2

| | ATTRIBUTE 1 | ATTRIBUTE 2 | ... | ATTRIBUTE D |
|---|---|---|---|---|
| MALFUNCTION 1 | $Q_{11}$ | $Q_{12}$ | ... | $Q_{1D}$ |
| MALFUNCTION 2 | $Q_{21}$ | $Q_{22}$ | ... | $Q_{2D}$ |
| ⋮ | ⋮ | ⋮ | | ⋮ |
| MALFUNCTION M | $Q_{M1}$ | $Q_{M2}$ | ... | $Q_{MD}$ |

110

| | ATTRIBUTE 1 | ATTRIBUTE 2 | ... | ATTRIBUTE D |
|---|---|---|---|---|
| MALFUNCTION 1 | $C_{11}$ | $C_{12}$ | ... | $C_{1D}$ |
| MALFUNCTION 2 | $C_{21}$ | $C_{22}$ | ... | $C_{2D}$ |
| ... | ... | ... | ... | ... |
| MALFUNCTION M | $C_{M1}$ | $C_{M2}$ | ... | $C_{MD}$ |

302

MALFUNCTION ANALYSIS APPARATUS, MALFUNCTION ANALYSIS METHOD, AND RECORDING MEDIUM

CROSS REFERENCE TO RELATED APPLICATIONS

This application is a National Stage of International Application No. PCT/JP2011/060108 filed Apr. 26, 2011, claiming priority based on Japanese Patent Application No. 2010-106810 filed May 6, 2010, the contents of all of which are incorporated herein by reference in their entirety.

TECHNICAL FIELD

The present invention relates to a malfunction analysis apparatus for a mechanical system, a malfunction analysis method, and recording medium.

BACKGROUND ART

When a malfunction occurs in a mechanical system, it is important to investigate a cause thereof quickly. However, it is difficult for man to analyze large amount of data acquired from the mechanical system which is complicated in recent years. Therefore, a support technique for investigation of the cause is generally used.

As such support technique for investigation of the cause, it is proposed a technique in which various sensor information and log information and so on (hereinafter, referred to as attention attribute) of an attribute regarding the occurred malfunction are narrowed down from the sensor information and the log information and so on which have different attribute and acquired from the mechanical system, and in which these information is provided to the user.

Specifically, some techniques are proposed, such as a technique (for example, refer to Patent Literature 1 and the Non-Patent Literature 1) which detects a changing point from time series data of a sensor, and obtains an attribute which is changing as an attention attribute, and a technique (for example, refer to Non-Patent Literature 2) which calculates a characteristic attribute from sensor information with principal component analysis or a similar technique, and obtains the attribute as an attention attribute.

PRIOR ART LITERATURE

Patent Literature

Patent Literature 1: Unexamined Japanese Patent Application Kokai Publication No. 2005-257416

Non-Patent Literature

Non-Patent Literature 1: Jun-ichi Takeuchi, Kenji Yamanishi, "A Unifying Framework for Detecting Outliers and Change Points from time Series," IEEE TRANSACTIONS ON KNOWLEDGE AND DATA ENGINEERING, VOL. 18, No. 4, APRIL 2006

Non-Patent Literature 2: Yoichi Fukuchi, Norio Hirai, Ken Suzaku, Atsushi Kono, and Tadahisa Harada, "VRM solution directed toward the safe and comfortable automotive society," VRM (Vehicle Relationship Management) Solution for a Safe and Comfortable Automobile Society, 2005

DISCLOSURE OF THE INVENTION

Problems to be Solved by the Invention

However, in the above-described techniques, in cases where both of a change which originates in the malfunctioning directly and a change occurred in relation to the malfunctioning are occurred, the attribute which originates in the malfunction directly and the attribute which originates in the malfunction indirectly are extracted as the attention attributes, respectively, without distinguishing them. Therefore, it is still insufficient from the viewpoint of extracting the attention attribute with high accuracy.

The present invention is made in view of the above circumstances, and an object thereof is to provide a malfunction analysis apparatus, a malfunction analysis method and recording medium, which can extract an attention attribute with high accuracy.

Means for Solving the Problems

To achieve the above-described object, a malfunction analysis apparatus according to a first aspect of the present invention includes:

a malfunction-contribution degree calculator obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifier specifying the malfunctioning elements being occurred, based on the malfunction-contribution degree obtained by the malfunction-contribution degree calculator;

a cause indicator specifier specifying, when a malfunction is occurred which is a combination of the malfunctioning elements, an indicator which is estimated as a cause of the malfunctioning elements specified by the malfunctioning elements specifier, based on the representative values of the plurality of indicators and the values of respective elements of the data to be analyzed; and an outputter outputting at least one of the malfunctioning elements specified by the malfunctioning elements specifier and the indicator specified by the cause indicator specifier.

To achieve the above-described object, a malfunction analysis method according to a second aspect of the present invention includes:

a malfunction-contribution degree calculation step for obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifying step for specifying the malfunctioning elements being occurred, based on the malfunction-contribution degree obtained in the malfunction-contribution degree calculation step;

a cause indicator specifying step for specifying, when a malfunction is occurred which is a combination of the malfunctioning elements, an indicator which is estimated as a cause of the malfunctioning elements specified in the malfunctioning elements specifying step, based on the representative values of the plurality of indicators, and the values of respective elements of the data to be analyzed; and an output step for outputting at least one of the malfunctioning elements specified in the malfunctioning elements specifying step and the indicator specified in the cause indicator specifying step.

To achieve the above-described object, a computer-readable recording medium according to a third aspect of the present invention records a program which causes a computer to function as:

a malfunction-contribution degree calculator obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifier specifying the malfunctioning elements being occurred, based on the malfunction-contribution degree obtained by the malfunction-contribution degree calculator;

a cause indicator specifier specifying, when a malfunction is occurred which is a combination of the malfunctioning elements, an indicator which is estimated as a cause of the malfunctioning elements specified by the malfunctioning elements specifier, based on the representative values of the plurality of indicators and the values of respective elements of the data to be analyzed; and an outputter outputting at least one of the malfunctioning elements specified by the malfunctioning elements specifier and the indicator specified by the cause indicator specifier.

Effects of the Invention

According to the present invention, it is possible to provide a malfunction analysis apparatus, a malfunction analysis method and recording medium, which can extract an attention attribute with high accuracy.

BRIEF DESCRIPTION OF DRAWINGS

FIG. 2 is a drawing illustrating an example of a malfunction pattern matrix;

MODE FOR CARRYING OUT THE INVENTION

Hereinafter, a malfunction analysis apparatus 100 according to embodiments of the present invention is described with reference to drawings.

(First Embodiment)

Figure 1:
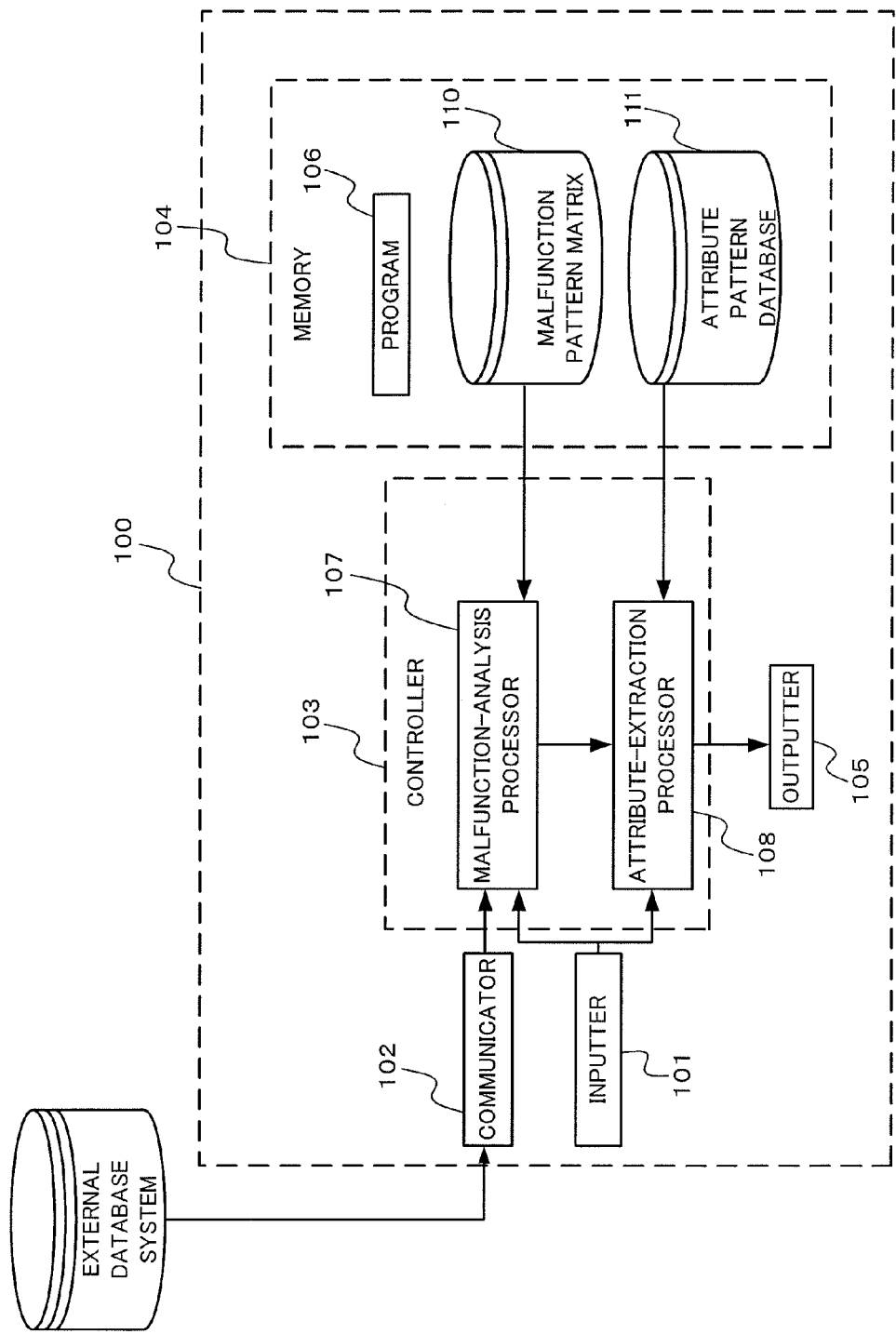
FIG. 1 is a block diagram illustrating an example of a malfunction analysis apparatus according to a first embodiment of the present invention.

The malfunction analysis apparatus 100 according to the present embodiment is a computer which operates by a programmed control, in which it specifies the malfunction occurred from sensor information, log information, and so on, which have different attribute, acquired from a mechanical system which is an object being analyzed, and extracts an attention attribute in the malfunction. Here, the attribute refers to types of various sensors and so on, for example, an ambient temperature sensor, an outdoor heat exchange sensor in an exterior unit in an air-conditioner. The malfunction analysis apparatus 100 includes an inputter 101, a communicator 102, a controller 103, a memory 104, and an outputter 105, as illustrated in FIG. 1.

The inputter 101 is an input device represented by a keyboard, a mouse and so on. The inputter 101 transfers an element for specifying the malfunctioning set by a user, an element for extracting an attention attribute, and a start signal for operating the malfunction analysis apparatus 100 to a malfunction analysis processor 107 and an attribute extraction processor 108 in the controller 103.

The communicator 102 includes an interface for connecting with an external database system. The external database system stores data regarding each attribute of the object being analyzed as log information or sensor information. The log information and sensor information are provided to the controller 103 through the communicator 102 from the external database system.

The controller 103 operates in accordance with a program 106 stored in the memory 104, and receives an input from the inputter 101 to provide a function required for the analysis. The controller 103 functions as the malfunction-analysis processor 107 and the attribute-extraction processor 108 by operating in accordance with the program 106.

The malfunction-analysis processor 107 is provided with an internal memory which stores temporarily the element for specifying the malfunction received from the inputter 101. The internal memory stores a correspondence table for specifying the malfunctioning in advance, in which the type of the malfunction-contribution degree mentioned later and the identification information on the malfunction are associated.

The attribute-extraction processor 108 is provided with an internal memory which stores temporarily the element for extracting an attribute, received from the inputter 101.

The memory 104 is constituted by a memory storage such as a hard disk and a semiconductor memory. The memory 104 stores a program 106 for operating the malfunction analysis apparatus 100, the malfunction pattern matrix 110, and the attribute pattern database 111.

The malfunction pattern matrix 110 is a matrix of the total of the malfunctions x the total of the attribute (M row D column), as illustrated in FIG. 2. The element $Q_{md}$ of the malfunction pattern matrix 110 represents the representative value of the attribute d to the malfunction m. The representative value is an average value of the attribute values corresponding to the malfunctions occurred before.

The attribute pattern database 111 is provided with a plurality of malfunction pattern tables 112.

Figure 4:
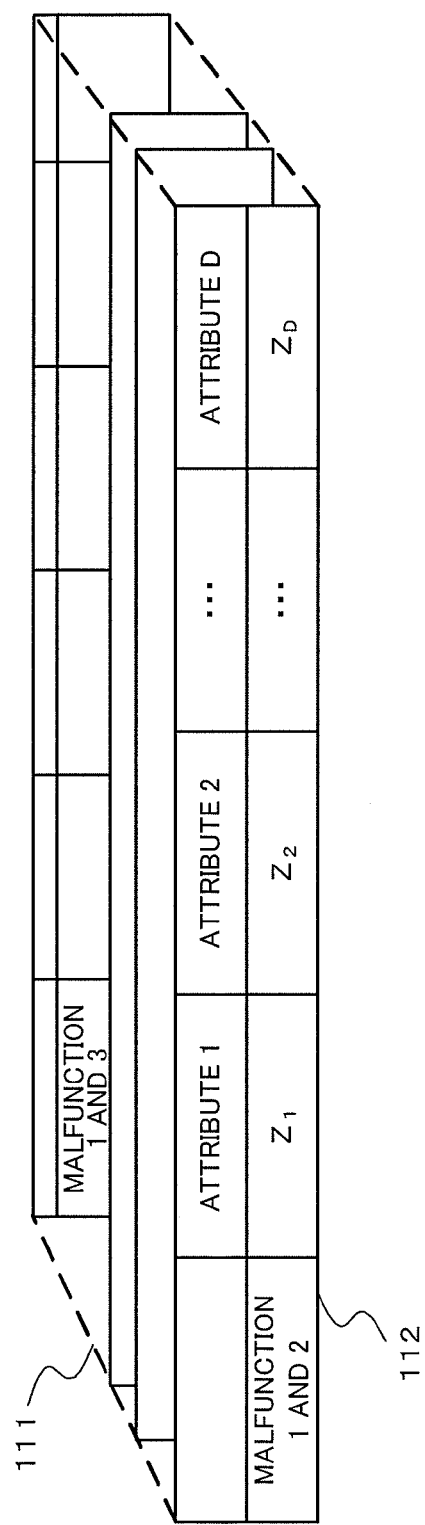
FIG. 4 is a drawing illustrating an example of an attribute pattern table.

The malfunction pattern table 112 is a table representing a combination of malfunctions, and the representative value of each attribute at the time of occurrence of the malfunction of the combination, as illustrated in FIG. 4. The representative value is an average value of the attribute values corresponding to the combinations of the malfunctions occurred before. The malfunction pattern tables 112 are stored in the attribute pattern database 111 in advance, the number of malfunction pattern tables 112 is obtained by adding the total of each malfunctions and the total of the combinations of each malfunction. Regarding the combination of malfunctions, the malfunction pattern table 112 corresponding to all combinations of the malfunctions may be stored, or the malfunction pattern table 112 corresponding to the combination of the specific malfunctions narrowed down in advance may be stored.

The outputter 105 is an output device represented by a display device and a printer.

Figure 3:
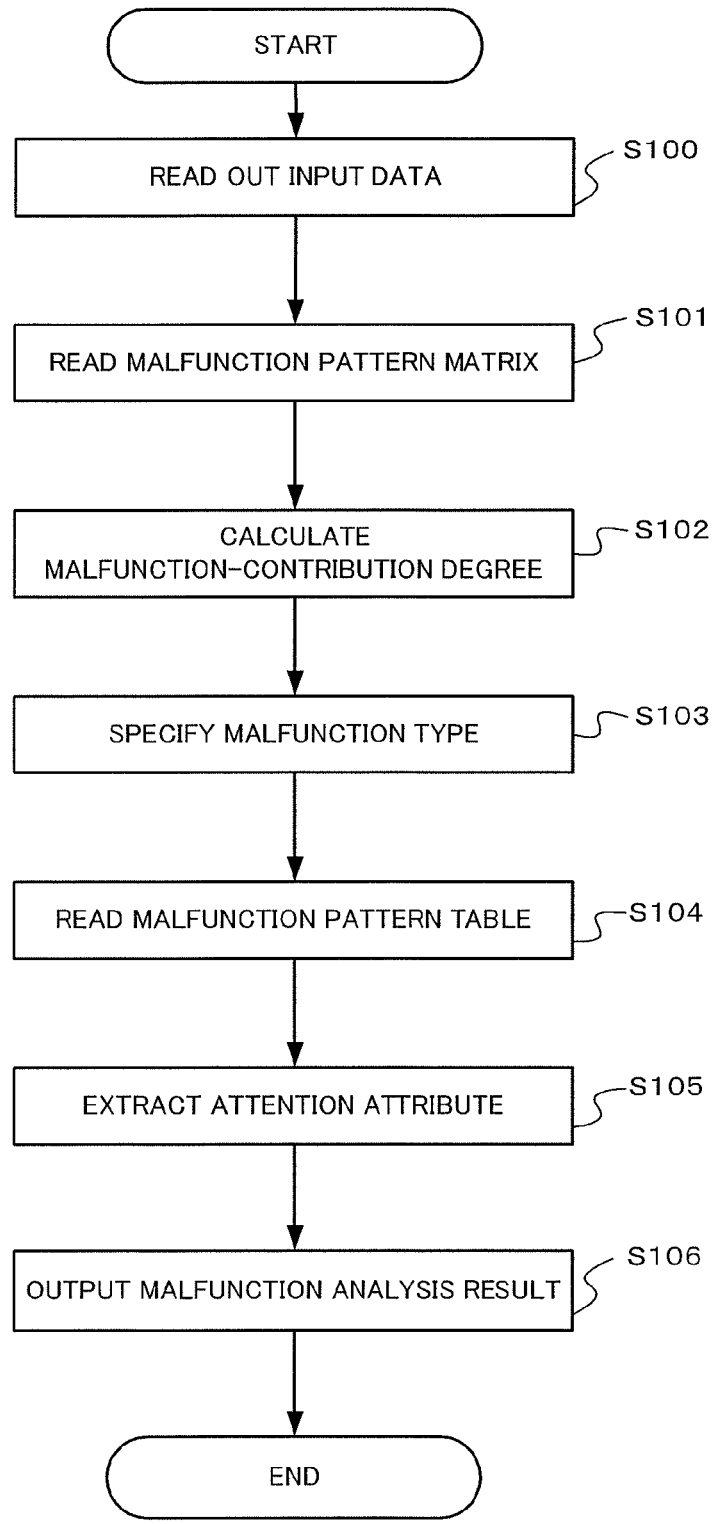
FIG. 3 is a flowchart illustrating an order of an analysis process performed in the malfunction analysis apparatus according to the first embodiment of the present invention.

Next, an operation of the malfunction analysis apparatus 100 according to the present embodiment is described with reference to FIG. 3.

A malfunction analysis process according to the present embodiment is started when receiving a start signal from the inputter 101.

First, the communicator 102 which is data input means reads out the sensor information and log information (hereinafter, referred to as input data) which are data to be analyzed from an external database system (step S100).

Next, the malfunction-analysis processor 107 receives elements for specifying a malfunction from the inputter 101, and receives input data from the communicator 102, respectively, and stores the elements for specifying the malfunction in the internal memory. The attribute-extraction processor 108 receives the elements for extracting the attribute from the inputter 101, and stores it in the internal memory.

The malfunction-analysis processor 107 reads the malfunction pattern matrix 110 from the memory 104 (step S101).

Subsequently, using the input data received from the communicator 102 and the malfunction pattern matrix 110 read from the memory 104, the malfunction-analysis processor 107 obtains a degree of the contribution (hereinafter, referred to as a malfunction-contribution degree) of each element of the malfunction to the malfunctioning (step S102), as described below.

The malfunction-analysis processor 107 represents predicted value of the input data, using a parameter vector A, as a function which has a row vector in the malfunction pattern matrix 110 read from the memory 104. The parameter vector A is a malfunction-contribution degree.

As an example of a function, a linear function as a following equation (1) is utilized.

$$f(Q,A)=X'=A_1Q_1+A_2Q_2+\ldots+A_MQ_M \quad (1)$$

The equation (1) represents the predicted values X' of the input data $X=X_1, X_2 \ldots X_D$ (D is a total of attributes, hereinafter the same shall apply), using malfunction-contribution degrees $A_1, A_2 \ldots A_M$ (M is a total of malfunctions, hereinafter the same shall apply), as a linear function of the vector $Q_{m1} \ldots Q_{mD}$ of the values each corresponding to attribute about the malfunction m. For example, the predicted value $X_1'$ of the input data $X_1$ is $X_1'=A_1Q_{11}+A_2Q_{21}+\ldots+A_MQ_{M1}$.

Next, the malfunction-analysis processor 107 obtains the value of each element of A which minimizes a distance between X and X' by solving a following equation (2) with respect to a loss function $L=\{X-f(Q,A)\}^2$ indicating the distance between X and X'.

$$A=\mathrm{argmin}\_A(X-X')^2 \quad (2)$$

The equation (2) represents a calculation which obtains A making $(X-X')^2$ the minimum.

Subsequently, the malfunction-analysis processor 107 specifies the malfunctioning from each element of A obtained as described above, based on the elements stored in the internal memory (step S103).

In the present embodiment, a threshold value is stored in the internal memory, as an element for specifying the malfunctioning received from the inputter 101. The malfunction-analysis processor 107 compares the values of the elements of A with the threshold values stored in the internal memory respectively, with respect to each element of A obtained as described above, and specifies the malfunction corresponding to the element as the malfunctioning in cases where the value of the element of A is equal to or more than the threshold value.

Providing one example, in cases where the values of respective elements of A which are obtained are $A_1=0.5$, $A_2=0.4$, and $A_3=0.1\ldots$ and the threshold value stored in the internal memory is 0.4, the malfunction-analysis processor 107 compares the value of each element of A and the threshold value, respectively, and extracts $A_1$ and $A_2$ which have the values of A equal to or more than 0.4. The malfunction-analysis processor 107 compares extracted $A_1$ and $A_2$ with the correspondence table previously stored in the internal memory, and specifies the malfunction 1 and the malfunction 2 corresponding to $A_1$ and $A_2$ as the malfunctioning.

The attribute-extraction processor 108 receives input data and the malfunction and malfunction-contribution degree which are specified and calculated by the malfunction-analysis processor 107 from the malfunction-analysis processor 107.

Next, the attribute-extraction processor 108 extracts as follows the attribute to be focused from each attribute of the input data, based on the malfunction specified by the malfunction-analysis processor 107.

The attribute-extraction processor 108 uses the specified malfunction as a key, and reads the attribute pattern table 112 corresponding to the specified malfunction from the attribute pattern database 111 of the memory 104 (step S104).

In cases where the malfunctions specified by the malfunction-analysis processor 107 are the malfunction 1 and the malfunction 2 as the above-mentioned example, the attribute-extraction processor 108 reads the attribute pattern table 112 as illustrated in FIG. 4.

The attribute-extraction processor 108 compares the values of respective elements of received input data and the values of the read attribute pattern table 112 respectively, and extracts the attention attribute based on the element stored in the internal memory (step S105).

For example, explaining the case of the above-mentioned example, the attribute-extraction processor 108 calculates an absolute value of the difference between the value of the element of the input data, and the value (value of the element $Z_1$) of the element of the attribute pattern table 112 illustrated in FIG. 4. Then, the attribute-extraction processor 108 compares the calculated absolute value of difference with the threshold value stored in the internal memory, and extracts, in cases where the calculated absolute value of difference is less than the threshold value, the attribute corresponding to each element as the attention attribute. The attribute-extraction processor 108 performs such operation for each element of the input data, and thus extracts the attribute to be focused from the input data.

Subsequently, the attribute-extraction processor 108 transfers the identification information of the malfunction, the malfunction-contribution degree, and the extracted attention attribute to the outputter 105, associated with the input data.

The outputter 105 outputs the received information (step S106).

The user investigates the cause of the malfunction occurred in the object being analyzed based on the information output by the outputter 105.

Thus, the malfunction analysis apparatus 100 provides, to the user, simultaneously the information such as the malfunction relevant to data to be analyzed, the degree of contribution, and which attribute has been affected by the malfunction. Whereby, the attention attribute can be extracted in high precision and this leads to time shortening of cause investigation of the malfunction.

(Modification)

This invention is not limited to the above-mentioned embodiment, but various modification and application can be made. For example, in the above-mentioned embodiment, an example is illustrated in which the input data being a data to be analyzed is read from the external database system, and an analysis process is performed. However, this is only an example, and the malfunction-analysis processor 107 may receive the data to be analyzed which the user input using the inputter 101 as the input data, and may perform the analysis process, alternatively, the embodiment may follow arbitrary manner of acquiring input data.

In the above-mentioned embodiment, an example is illustrated in which the representative value of the malfunction pattern matrix 110 is the average value of the attribute values corresponding to the malfunctions occurred before, and the representative value of the attribute pattern table 112 is the average value of the attribute values corresponding to the combinations of the malfunctions occurred before, but it is not necessarily limited to this example. The representative values of the malfunction pattern matrix 110 and the attribute pattern table 112 may have any values, such as the values defined by the specialist in advance, the value estimated in a predetermined manner from the previous malfunction data, and so on.

In the above-mentioned embodiment, an example is illustrated in which the attribute pattern table 112 is stored in advance in the attribute pattern database 111 of the memory 104, but it is not necessarily limited to this example. The attribute pattern table 112 corresponding to the malfunction specified by the malfunction-analysis processor 107 may be generated from the representative value of each element of the malfunction pattern matrix 110, based on the malfunction specified by the malfunction-analysis processor 107. For example, in cases where the malfunctions specified by the malfunction-analysis processor 107 are the malfunction 1 and the malfunction 2 as the above-mentioned example, the values of respective elements of the attribute pattern table 112 corresponding to the malfunctions 1 and 2 may be defined by the sum of the representative value regarding the malfunction 1 of the malfunction pattern matrix 111 and the representative value regarding the corresponding malfunction 2. Thus, the attribute pattern table 112 may be generated in an arbitrary manner.

In the above-mentioned embodiment, an example is illustrated in which the malfunction-analysis processor 107 utilizes the linear function as $f(Q, A)$, but it is not necessarily limited to this example. The malfunction-analysis processor 107 can utilize arbitrary functions, such as a multinomial function, as $f(Q, A)$.

In the above-mentioned embodiment, the malfunction-analysis processor 107 uses the function indicating the distance between X and X' as the loss function L, but this is only an example and it is not necessarily limited to this example. For example, the malfunction-analysis processor 107 can utilize a logarithm loss function as the loss function L, in cases where the predicted value of the input data is regarded as probability distributions. Moreover, the malfunction-analysis processor 107 may utilize arbitrary functions, such as a structural risk minimization, a maximum likelihood estimator, and Bayesian estimation, as the loss function L.

In the above-mentioned embodiment, an example is illustrated in which the element for specifying the malfunction by the malfunction-analysis processor 107 and the element for extracting the attention attribute by the attribute-extraction processor 108 are set by the inputter 101 using the threshold value, but this is only an example and the inputter 101 may set arbitrary elements. Moreover, the elements may not need to be set, and in that case, with respect to each value which the malfunction-contribution degree is non-negative, corresponding malfunction is specified, and the attribute corresponding to this malfunction is extracted as the attention attribute.

(Second Embodiment)

The malfunction analysis apparatus 200 according to the present embodiment is a malfunction analysis apparatus which extracts the malfunctioning and the attribute relevant to the malfunctioning as the attention attribute, without storing in advance the malfunction pattern matrix 110 in first embodiment into the memory 104.

Figure 5:
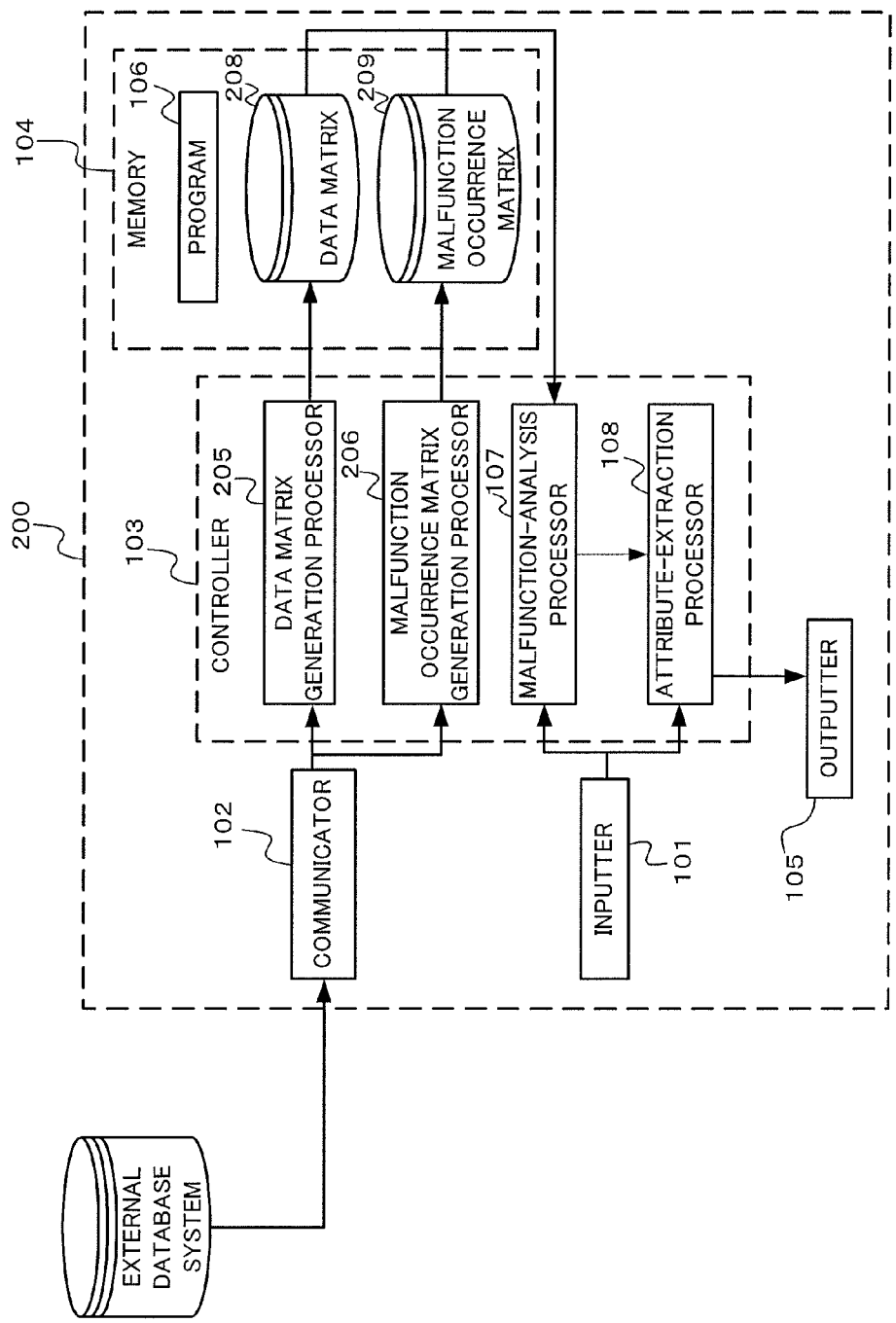
FIG. 5 is a block diagram illustrating an example of the malfunction analysis apparatus of a second embodiment according to the present invention.

The malfunction analysis apparatus 200 according to the present embodiment further includes, in the controller 103, a data matrix generation processor 205 and a malfunction occurrence matrix generation processor 206, as illustrated in FIG. 5, in comparison with first embodiment. Moreover, it is different from the malfunction analysis apparatus 100 in that the memory 104 is not provided with the malfunction pattern matrix 110 and the attribute pattern database 111. Besides, explanations for same member and constitution as those in the first embodiment are omitted.

Figure 8:
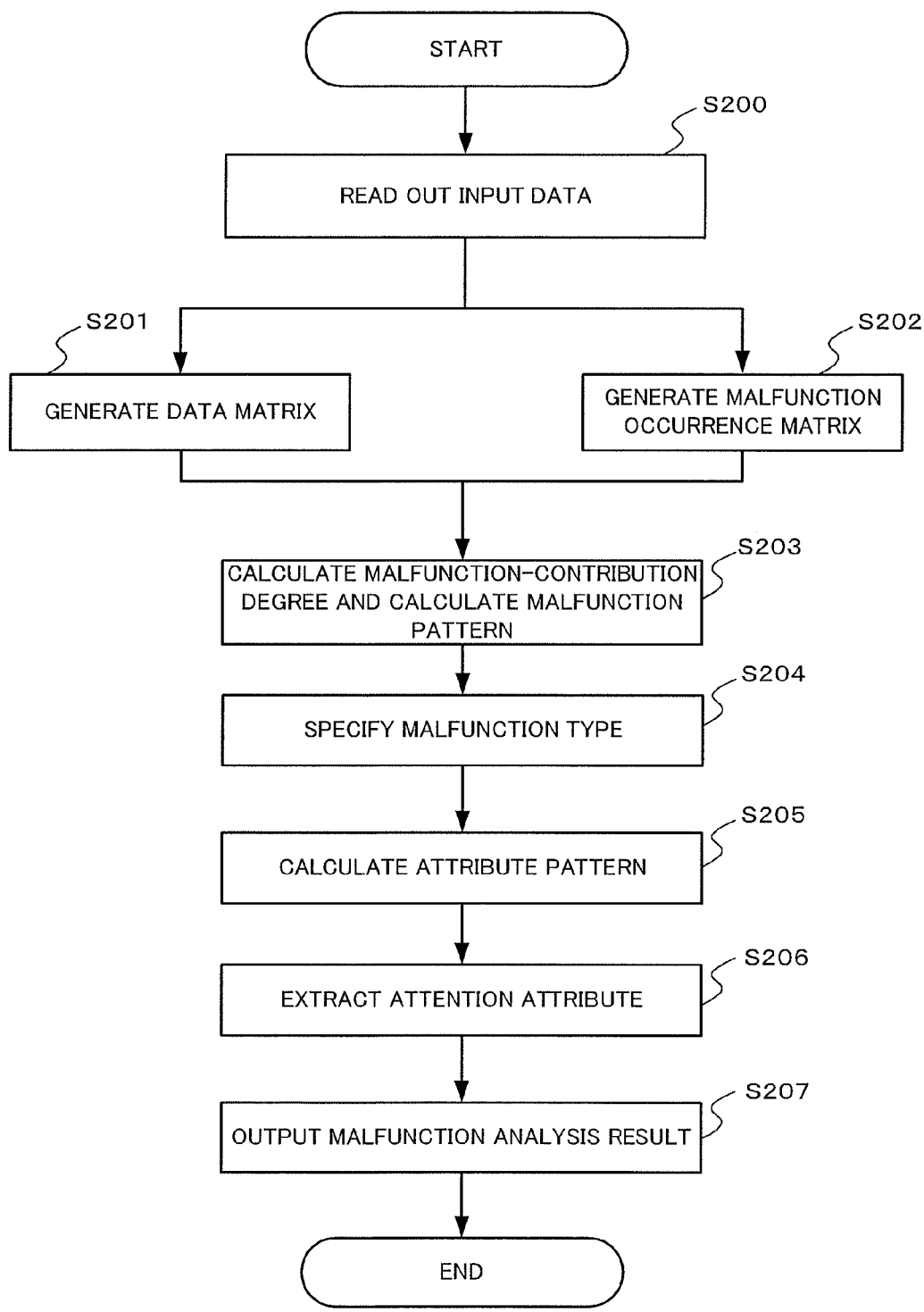
FIG. 8 is a flowchart illustrating an order of an analysis process performed in the malfunction analysis apparatus according to the second embodiment of the present invention.

Next, with reference to FIG. 8, the operation of the malfunction analysis apparatus 200 according to the present embodiment will be described.

First, the communicator 102 reads out a plurality of input data items (step S200). The input data items in the present embodiment include the sensor information and the log information, as well as a type of a related malfunction at the same time.

The data matrix generation processor 205 and the malfunction occurrence matrix generation processor 206 read a plurality of input data items from the communicator 102 which is data input means.

Figure 6:
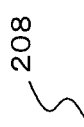
FIG. 6 is a drawing illustrating an example of a data matrix.

The data matrix generation processor 205 arranges attribute values from a plurality of read input data items into a data matrix 208 of the number of data items x the number of attributes (N row D column) (N is total number of data items, hereinafter the same shall apply), as illustrated in FIG. 6, and stores them to the memory 104 (step S201). Hereinafter, the data matrix 208 is expressed by G. Each row vector $G_n$ illustrates one input data item.

Figure 7:
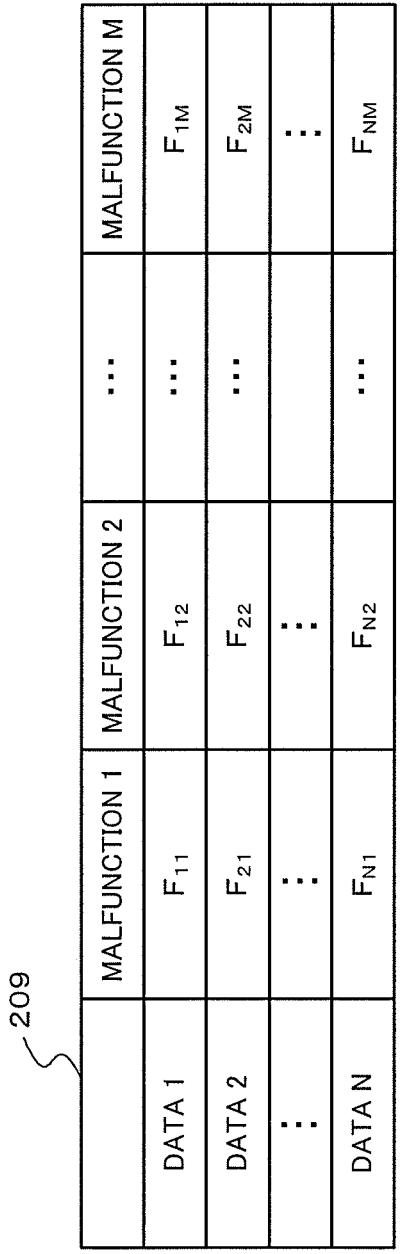
FIG. 7 is a drawing illustrating an example of a malfunction occurrence matrix.

The malfunction occurrence matrix generation processor 206 arranges the presence or absence of the malfunction from the read input data in the malfunction occurrence matrix 209 of the number of data items x total of the malfunctions (N row M column), as illustrated in FIG. 7, and stores them to the memory 104 (step S202). Hereinafter, the malfunction occurrence matrix 209 is expressed by F, and each row vector of F is expressed by $F_n$. For example, the element $F_{ij}$ represents the presence or absence of the malfunction j for data i, and it is 0 in cases where the malfunction j has not occurred, and it is 1 in cases where the malfunction j has occurred.

The malfunction-analysis processor 107 reads the data matrix 208 and the malfunction occurrence matrix 209 from the memory 104.

The malfunction-analysis processor 107 optimizes the loss function as the first embodiment. In the step S102 in the first embodiment, the malfunction-analysis processor 107 optimizes the loss function regarding A. However, in the present embodiment, the malfunction-analysis processor 107 optimizes with mathematical programming regarding A and Q, and obtains the malfunction-contribution degree as well as each element of corresponding malfunction pattern matrix 110 (step S203).

For example, a case will be briefly described where the malfunctions 1 and 2 occur for each of two input data ($G_{1-3}$ and $G_{1-3}'$) each having three attributes.

In this case, the malfunction-analysis processor 107 generates the data matrix G represented by a following equation (3), and the malfunction occurrence matrix F represented by a following equation (4).

[equation 1]
$$G = \begin{pmatrix} G_1 & G_2 & G_3 \\ G_1' & G_2' & G_3' \end{pmatrix}, \quad (3)$$

[equation 2]
$$F = \begin{pmatrix} 1 & 1 & 0 & \ldots & 0 \\ 1 & 1 & 0 & \ldots & 0 \end{pmatrix} \quad (4)$$

Also in the present embodiment like the first embodiment, when a linear function is utilized as a function which represents the predicted value g of the input data G, the linear function is represented by $f(Q, A, F) = g = A_1 F_1 Q_1 + A_2 F_2 Q_2 + \ldots + A_M F_M Q_M$.

In this case, the predicted value g1 of the element $G_1$ and $G_1'$ of the input data is represented by $g_1 = A_1 Q_{11} + A_2 Q_{21}$.

Like the first embodiment, the distance between the data matrix G and the predicted value g is represented by a following equation (5) and a following equation (6).

[equation 3]
$$\sum_{i=1}^{3}(G_i - g_i)^2 \quad (5)$$

[equation 4]
$$\sum_{i=1}^{3}(G_i' - g_i)^2 \quad (6)$$

Then, the malfunction-analysis processor 107 calculates the sum of the equation (5) and the equation (6). The sum of the equation (5) and the equation (6) results in a function of A and Q. The malfunction-analysis processor 107 obtains the value of each element of A and Q so that the sum of the equation (5) and the equation (6) is minimum utilizing the mathematical programming.

Subsequently, the malfunction-analysis processor 107 specifies, as is the case with the first embodiment, the malfunction from each element of the malfunction-contribution degree A obtained as described above (step S204).

Next, the malfunction-analysis processor 107 obtains the attribute pattern table 112 representing the malfunction specified as described above and the representative value of each attribute corresponding to the number of attribute of the input data, using each element of Q obtained as described above (step S205).

For example, the malfunction-analysis processor 107 obtains the representative value $Z_1$ of the attribute 1 in cases where the malfunctions 1 and 2 occur, as illustrated in FIG. 4, by the sum of the representative value $Q_{11}$ of each attribute in cases where only the malfunction 1 occurs and the representative value $Q_{21}$ of each attribute in cases where only the malfunction 2 occurs. The malfunction-analysis processor 107 repeats this process for each attribute of Q obtained as described above to obtain the attribute pattern table 112 regarding the specified malfunction.

The attribute-extraction processor 108 reads out the data matrix 208, the malfunction specified by the malfunction-analysis processor 107, the malfunction-contribution degree and the attribute pattern table 112 from the malfunction-analysis processor 107.

The attribute-extraction processor 108 compares each element of the data matrix 208 with each element of the attribute pattern table 112, and extracts the attention attribute as is the case with the first embodiment (step S206).

Subsequently, the attribute-extraction processor 108 correlates the malfunction, the malfunction-contribution degree, and the extracted attention attribute with the data matrix 208, and transfers them to the outputter 105. Then, the outputter 105 outputs the received information (step S207).

Thus, even if the malfunction pattern representing the representative value of the attribute for each malfunction is unknown, the malfunction analysis apparatus 200 can provide the information such as the malfunction relevant to data to be analyzed, the degree of contribution, and which attribute has been affected by the malfunction, to the user at the same time. As a result, the attention attribute can be extracted with high accuracy, without requiring the preliminary knowledge about the malfunction of the object being analyzed.

(Modification)

The above-mentioned embodiment is only an example, and various modification and application can be made as is the case with the first embodiment. In the above-mentioned embodiment, the attribute pattern table 112 is obtained utilizing the sum of the representative values of respective attributes for each malfunction, but this is only one example and arbitrary manners can be utilized.

In the above-mentioned embodiment, an example is illustrated in which the malfunction-analysis processor 107 generates the malfunction pattern matrix 110, and calculates each element of the attribute pattern table 112 corresponding to the specified malfunction based on each element of the generated malfunction pattern matrix 110. However, this is only one example and it is not necessarily limited to this example. The attribute pattern table 112 may be stored in advance. Furthermore, the value of each of the elements may have any values, such as the values defined by the specialist in advance, the value estimated from the previous data, and so on.

(Third Embodiment)

The malfunction analysis apparatus 300 according to the present embodiment is for calculating the degree of change of each attribute value at the time of malfunction, using time series data as the input data, thereby outputting the change information generated for the attention attribute, in addition to the information output by the malfunction analysis apparatus 100 in the first embodiment.

Figure 9:
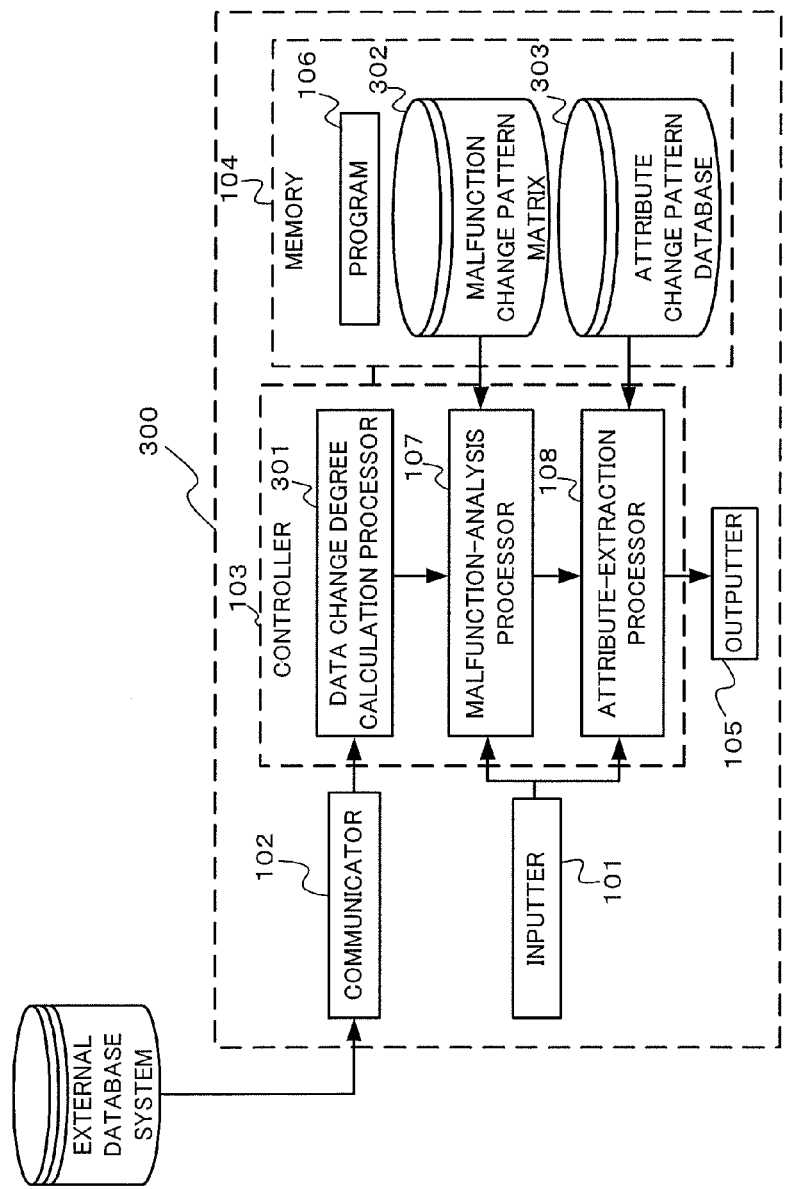
FIG. 9 is a block diagram illustrating an example of the malfunction analysis apparatus according to a third embodiment of the present invention.

The malfunction analysis apparatus 300 according to the present embodiment further includes a data change degree calculation processor 301 in the controller 103, as illustrated in FIG. 9, in comparison with the first embodiment. Moreover, it is different from the malfunction analysis apparatus 100 in that the memory 104 is provided with a malfunction change pattern matrix 302 instead of the malfunction pattern matrix 110, and an attribute change pattern database 303 instead of the attribute pattern database 111. Besides, explanations for same member and constitution as those in the first embodiment are omitted.

Figure 10:
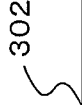
FIG. 10 is a drawing illustrating an example of a malfunction change pattern matrix.

The malfunction change pattern matrix 302 is a matrix of the total of the malfunctions x the total of the attributes (M row D column) as illustrated in FIG. 10, as with the malfunction pattern matrix in the first embodiment. However, unlike the elements of the malfunction pattern matrix in the first embodiment, the elements $C_{md}$ of the malfunction change pattern matrix 302 represent the representative values of the degree of change of the attribute d for the malfunction m. The representative value is an average value of the degrees of change of the attribute corresponding to the malfunctions occurred before.

The attribute change pattern database 303 is provided with the attribute change pattern table 304.

The attribute change pattern table 304 is a table similar to the attribute pattern table in the first embodiment as illustrated in FIG. 4, therefore illustration is omitted. The value of each element of the attribute change pattern table 304 represents the combination of respective malfunctions, and the representative value of the degree of change of each attribute corresponding to the combination. The representative value is an average value of the degrees of change of the attribute corresponding to the combination of the malfunctions occurred before.

Figure 11:
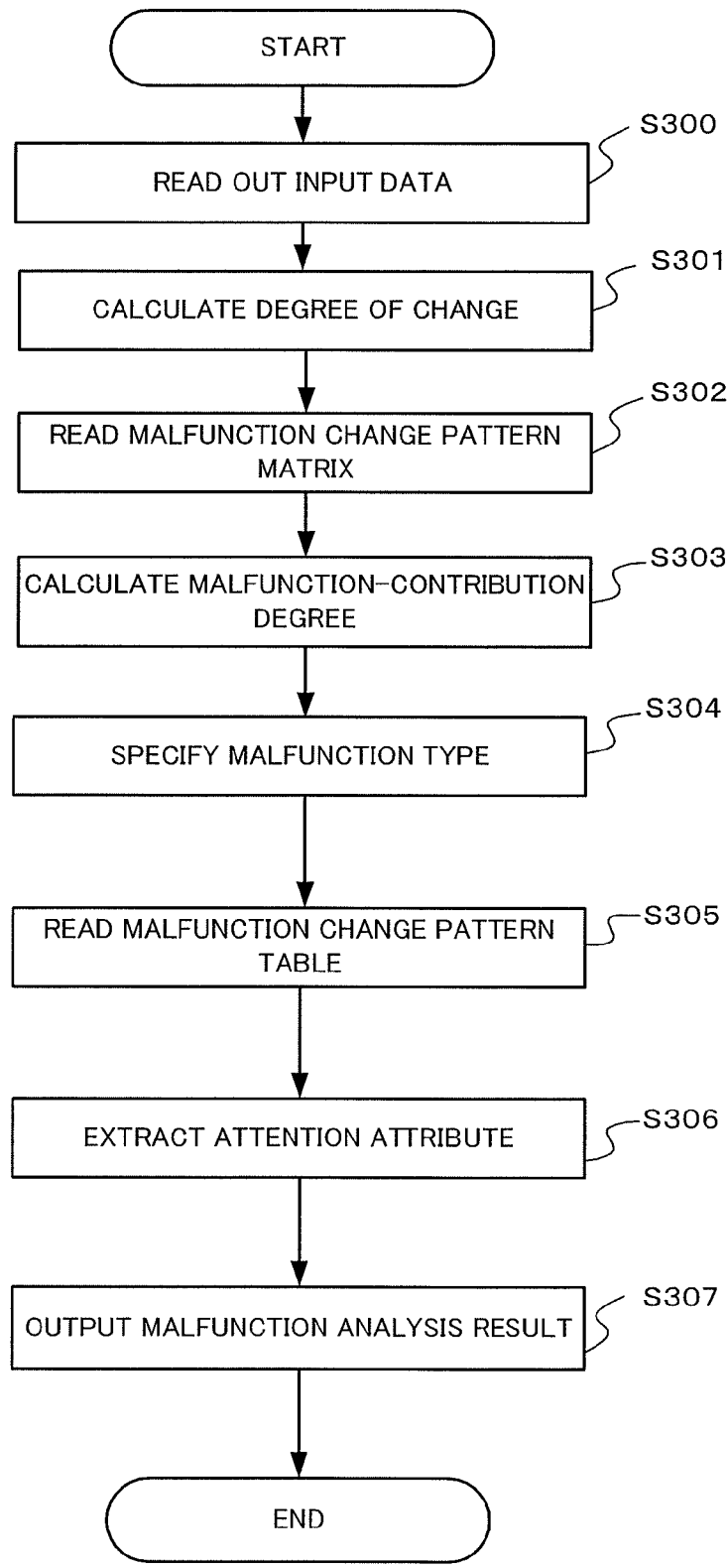
FIG. 11 is a flowchart illustrating an order of an analysis process performed in the malfunction analysis apparatus according to the third embodiment of the present invention.

Next, with reference to FIG. 11, the operation of the analysis apparatus 300 according to the present embodiment is described.

First, the communicator 102 which is data input means reads out the input data which is a data to be analyzed from the external database system (step S300).

The input data in the present embodiment is time series data of the sensor information or log information, which has different attributes, acquired from a mechanical system which is the object being analyzed. The time series data in the present embodiment is continuation values as the number of rotations of the engine of a car, or the value from a temperature sensor.

Next, the data change degree calculation processor 301 receives the input data from the communicator 102, and calculates the degree of change corresponding to each attribute of the input data utilizing arbitrary change degree calculation technique (step S301). As an example of the change degree calculation technique, Change Finder (Non-Patent Literature 1) or IBM method (Patent Literature 1) or the like is used.

Subsequently, the malfunction-analysis processor 107 receives the degree of change obtained by the data change degree calculation processor 301 from the data change degree calculation processor 301, and reads the malfunction change pattern matrix 302 from the memory 104 (step S302).

The malfunction-analysis processor 107 obtains the malfunction-contribution degree by the similar process as the first embodiment using the received degree of change and the malfunction change pattern matrix 302 (step S303), and specifies the malfunction (step S304). Here, the degree of change in the present embodiment corresponds to the input data in the first embodiment, and the malfunction change pattern matrix 302 in the present embodiment corresponds to the malfunction pattern matrix 110 in the first embodiment.

The attribute-extraction processor 108 receives the degree of change, the malfunction, and the malfunction-contribution degree from the malfunction-analysis processor 107, and reads the attribute change pattern table 304 from the attribute change pattern database 303 in the memory 104 as is the case with the first embodiment (step S305).

The attribute-extraction processor 108 extracts the attention attribute by the similar process as the first embodiment (step S306), correlates the malfunction, the malfunction-contribution degree, and the attention attribute corresponding to the malfunction with the degree of change, and transfers them to the outputter 105. Here, the attribute change pattern table 304 in the present embodiment corresponds to the attribute pattern table 112 in the first embodiment.

The outputter 105 outputs the received information (step S307).

Thus, the malfunction analysis apparatus 300 can provide the user with the detailed information, for example, what kind of change occurred for which attribute according to which malfunction, by using the time series data as the data to be analyzed. As a result, it is possible to extract the attention attribute with high accuracy, and to provide the user with the detailed information at the time of malfunction, thus the cause of the malfunction can be specified with high accuracy.

(Modification)

The above-mentioned embodiment is only one example, and various modification and application can be made.

In the above-mentioned embodiment, an example is illustrated in which the continuation value is used as time series data, but this is only an example and the time series data may be discrete value, such as ON/OFF data of various functions.

In the above-mentioned embodiment, an example is illustrated in which the attribute change pattern table 304 is stored in the attribute change pattern database 303 in the memory 104 in advance, but it is not necessarily limited to this example. The attribute change pattern table 304 may be generated from the malfunction change pattern matrix and so on, as is the case with the first embodiment.

(Fourth Embodiment)

The malfunction analysis apparatus 400 according to the present embodiment calculates the degree of change of each attribute value at the time of malfunctioning, as with the analysis apparatus 300 in the third embodiment, using the time series data. Furthermore, the malfunction analysis apparatus 400 specifies required information as with the analysis apparatus 200 in the second embodiment, without requiring the preliminary knowledge regarding the malfunction.

Figure 12:
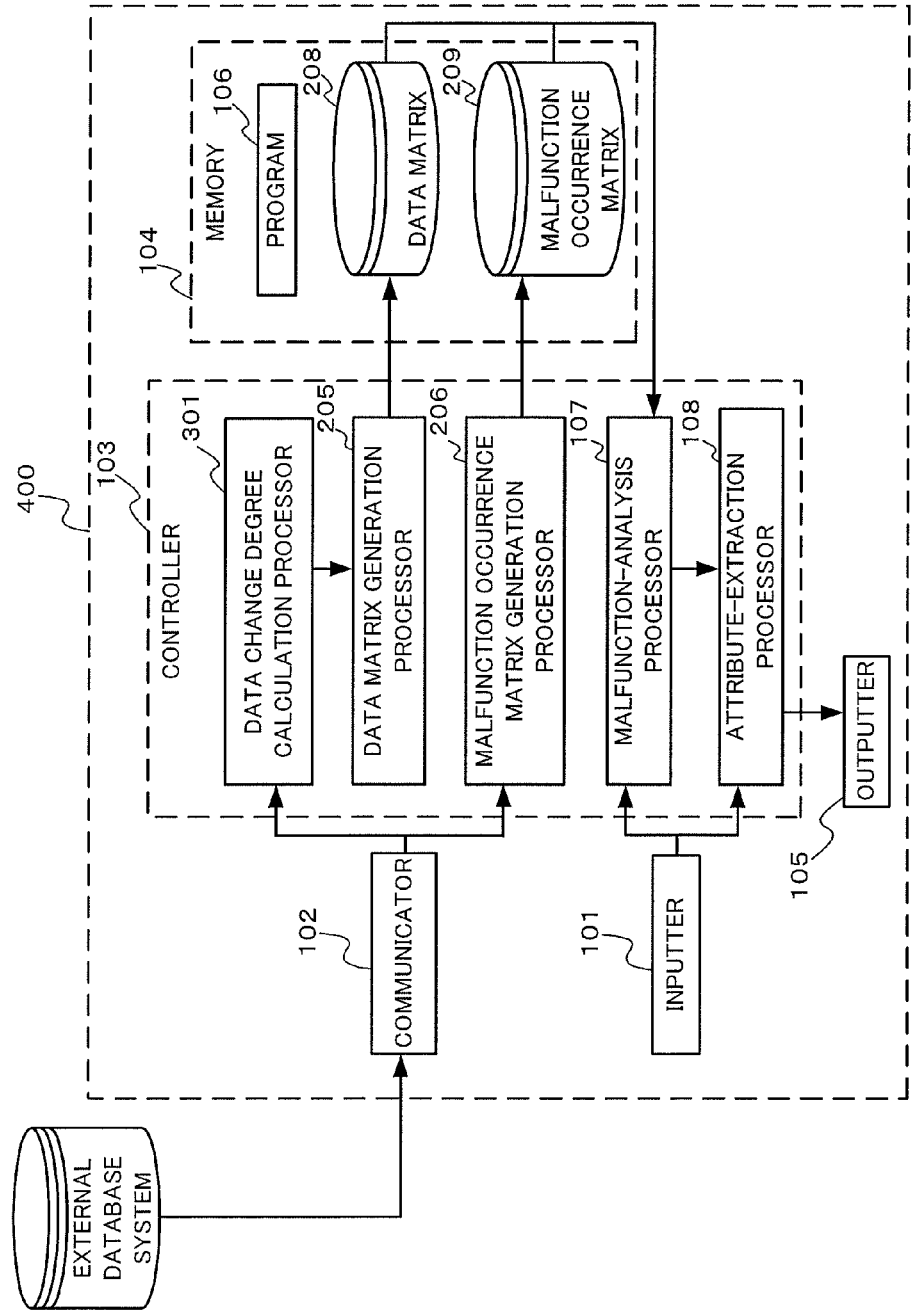
FIG. 12 is a block diagram illustrating an example of the malfunction analysis apparatus according to a fourth embodiment of the present invention.

The malfunction analysis apparatus 400 according to the present embodiment further include the data change degree calculation processor 301 according to the third embodiment in the controller 103, as illustrated in FIG. 12, in comparison with the second embodiment. Besides, explanations for same member and constitution as those in the second embodiment are omitted.

Figure 13:
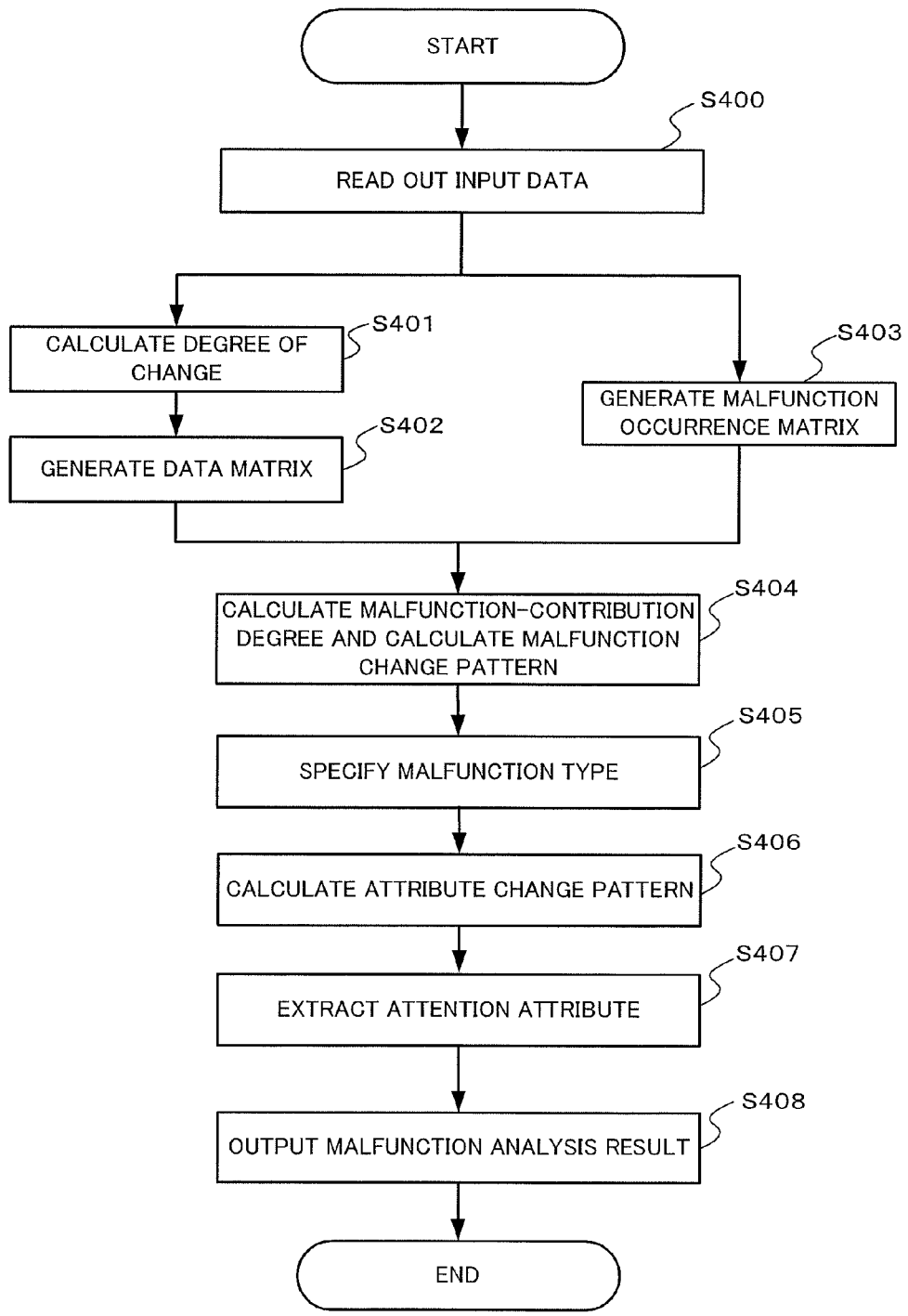
FIG. 13 is a flowchart illustrating an order of an analysis process performed in the malfunction analysis apparatus according to the fourth embodiment of the present invention.

Next, with reference to FIG. 13, the operation of the analysis apparatus 400 according to the present embodiment is described.

The communicator 102 reads out the input data which is time series data from the external database system, as is the case with the third embodiment (step S400), and transfers the read input data to the data change degree calculation processor 301 and the malfunction occurrence matrix generation processor 206.

The data change degree calculation processor 301 calculates the degree of change corresponding to each attribute of the input data by the similar process as that in the third embodiment (step S401).

The data matrix generation processor 205 receives the degree of change calculated by the data change degree calculation processor 301, arranges the degree of change in the data matrix 208 of the number of data items x the number of attributes (N row D column), and store them in the memory 104 (step S402).

By the similar process as that in the second embodiment, the malfunction occurrence matrix generation processor 206 generates the malfunction occurrence matrix 209, and stores it in the memory 104 (step S403).

The malfunction-analysis processor 107 receives the data matrix 208 and the malfunction occurrence matrix 209 from the memory unit 104, calculates the malfunction-contribution degree and the malfunction change pattern by the similar process as that in the second embodiment (step S404), and specifies the malfunction (step S405).

Subsequently, the malfunction-analysis processor 107 obtains the attribute change pattern table 304 similar to that in the third embodiment, by the similar process as that in the second embodiment (step S406), and extracts the attention attribute (step S407).

As is the case with the third embodiment, the attribute-extraction processor 108 correlates, the malfunction, the malfunction-contribution degree and the attention attribute corresponding to the malfunction, with the degree of change, and transfers them to the outputter 105.

The outputter 105 outputs the received information (step S408).

Thus, even if the malfunction change pattern representing the representative value of the degree of change of the attribute in each malfunction is unknown, the malfunction analysis apparatus 400 can provide the user with the detailed information, for example, what kind of change occurred for which attribute according to which malfunction. As a result, the attention attribute can be extracted with high accuracy, without requiring the preliminary knowledge about the malfunction of the object being analyzed, and it is possible to provide the user with the detailed information at the time of malfunction, thus the cause of the malfunction can be specified with high accuracy.

Besides, the above-mentioned embodiment is only an example, and various modification and application can be made.

In the above-mentioned embodiment, an example is illustrated in which the attribute change pattern table 304 can be obtained by the malfunction-analysis processor 107, but it is not necessarily limited to this example. The attribute change pattern table 304 may be stored in the attribute change pattern database 303 of the memory 104 in advance.

Moreover, the functions of the malfunction analysis apparatuses 100 through 400 according to the above-mentioned embodiments can be achieved using a dedicated hardware or a general computer system.

It is possible to constitute the apparatus which executes the above-described processes in the above-mentioned embodiments, for example, by recording the program 106 which is stored in the memory 104 of the malfunction analysis apparatuses 100 through 400 into a computer readable recording medium such as a flexible disk, CD-ROM (Compact Disk Read-Only Memory), DVD (Digital Versatile Disk) and MO (Magneto-Optical disk) to distribute the recording medium, and installing the program in a computer.

Alternatively, the program is stored in a disk apparatus or the like, included in a predetermined server apparatus on the communication network such as Internet, and the program may be downloaded to a computer by superimposing on a carrier wave.

Alternatively, the above-described processes can be realized by activating and executing the program while transmitting the program through a communication network.

Furthermore, the above-described processes can be realized by causing entire program or a part of program to be executed on a server apparatus, while a computer transmits and receives the information regarding the processes through a communication network.

Besides, in cases where OS (Operating System) shares and realizes the above-described functions, or in cases where OS and application realizes the functions in cooperation, parts other than OS may be stored in the recording medium and distributed, or may be downloaded to a computer.

A part of or all of above-described embodiments would also be described as the following supplementary notes, but it is not limited to following description.

(Supplementary Note 1)

A malfunction analysis apparatus comprising:

a malfunction-contribution degree calculator obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifier specifying the malfunctioning elements being occurred, based on the malfunction-contribution degree obtained by the malfunction-contribution degree calculator;

a cause indicator specifier specifying, when a malfunction is occurred which is a combination of the malfunctioning elements, an indicator which is estimated as a cause of the malfunctioning elements specified by the malfunctioning elements specifier, based on the representative values of the plurality of indicators and the values of respective elements of the data to be analyzed; and an outputter outputting at least one of the malfunctioning elements specified by the malfunctioning elements specifier and the indicator specified by the cause indicator specifier.

(Supplementary Note 2)

The malfunction analysis apparatus according to Supplementary note 1, wherein the malfunction-contribution degree calculator includes:

a memory for data to be analyzed which stores the data to be analyzed of which elements have the values generated based on the values of the plurality of indicators for the object being analyzed; and an obtainer obtaining the malfunction-contribution degree, which indicates the degree that individual malfunctions (hereinafter, referred to as the malfunctioning elements) contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed stored in the memory for data to be analyzed, which are stored in advance, wherein the cause indicator specifier specifies, when the malfunction is occurred which is the combination of the malfunctioning elements, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed.

(Supplementary Note 3)

The malfunction analysis apparatus according to Supplementary note 1, wherein the malfunction-contribution degree calculator includes:

a memory for data to be analyzed which stores the data to be analyzed of which elements have the values generated based on the values of the plurality of indicators for the object being analyzed; and an obtainer obtaining the malfunction-contribution degree, which indicates the degree that individual malfunctions (hereinafter, referred to as the malfunctioning elements) contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed stored in the memory for data to be analyzed, which are stored in advance, wherein the cause indicator specifier calculates, when the malfunction is occurred which is the combination of the malfunctioning elements, values of the elements of an attribute pattern which represents the set of the representative values of the plurality of indicators based on representative values of the elements of a malfunction pattern, and specifies the indicator which is estimated as the cause of the malfunctioning elements specified by the malfunctioning elements specifier, based on the calculated values of the elements of attribute pattern, and the values of respective elements of the data to be analyzed stored in the memory for data to be analyzed.

(Supplementary Note 4)

The malfunction analysis apparatus according to Supplementary note 1, further comprising:

a data matrix generator generating a first matrix from the data to be analyzed by arranging each indicator value of the data to be analyzed;

a data matrix memory storing the value of each element in each line of the first matrix generated by the data matrix generator as the data to be analyzed; and a malfunction occurrence matrix generator generating a second matrix from the data to be analyzed by arranging presence or absence of malfunction occurrence to the data to be analyzed, wherein the malfunction-contribution degree calculator includes:

a malfunction pattern memory storing the value of each element of data in which the second matrix generated by the malfunction occurrence matrix generator and an unknown malfunction pattern representing representative values of the plurality of indicators corresponding to a plurality of malfunctions respectively are associated; and a calculator calculating the malfunction-contribution degree and the values of the elements of the malfunction pattern, based on a relative relationship between corresponding values of the values of a plurality of elements of the data to be analyzed stored in the data matrix memory and the values of respective elements stored in the malfunction pattern memory, wherein the cause indicator specifier specifies, when the malfunction is occurred which is the combination of the malfunctioning elements, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed.

(Supplementary Note 5)

The malfunction analysis apparatus according to Supplementary note 1, further comprising:

a data matrix generator generating a first matrix from the data to be analyzed by arranging each indicator value of the data to be analyzed;

a data matrix memory storing the value of each element in each line of the first matrix generated by the data matrix generator as the data to be analyzed; and a malfunction occurrence matrix generator generating a second matrix from the data to be analyzed by arranging presence or absence of malfunction occurrence to the data to be analyzed, wherein the malfunction-contribution degree calculator includes:

a malfunction pattern memory storing the value of each element of data in which the second matrix generated by the malfunction occurrence matrix generator and an unknown malfunction pattern representing representative values of the plurality of indicators corresponding to a plurality of malfunctions respectively are associated; and a calculator calculating the malfunction-contribution degree and the values of the elements of the malfunction pattern, based on a relative relationship between corresponding values of the values of a plurality of elements of the data to be analyzed stored in the data matrix memory and the values of respective elements stored in the malfunction pattern memory, wherein the cause indicator specifier calculates, when the malfunction is occurred which is the combination of the malfunctioning elements, values of the elements of an attribute pattern which represents the set of the representative values of the plurality of indicators based on values of the elements of a malfunction pattern, and specifies the indicator which is estimated as the cause of the malfunctioning elements specified by the malfunctioning elements specifier, based on the calculated values of the elements of the attribute pattern, and the values of respective elements of the data to be analyzed stored in the memory for data to be analyzed.

(Supplementary Note 6)

The malfunction analysis apparatus according to any one of Supplementary notes 2 to 5, wherein the memory for data to be analyzed stores the values of the plurality of indicators of the object being analyzed as the data to be analyzed without any change.

(Supplementary Note 7)

The malfunction analysis apparatus according to any one of Supplementary notes 2 to 5, further comprising:

a change degree calculator obtaining a degree of change of value of each indicator for the data to be analyzed; and a memory storing, as the data to be analyzed, the set of values which represents the degree of change obtained by the change degree calculator, wherein the malfunction pattern is a value representing the representative value of the degree of change for the value of each indicator corresponding to each malfunction, and the attribute pattern is a value representing the representative value of the degree of change for the value of each indicator corresponding to the combination of respective malfunctions.

(Supplementary Note 8)

A malfunction analysis method comprising:

a malfunction-contribution degree calculation step for obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifying step for specifying the malfunctioning elements being occurred, based on the malfunction-contribution degree obtained in the malfunction-contribution degree calculation step;

a cause indicator specifying step for specifying, when a malfunction is occurred which is a combination of the malfunctioning elements, an indicator which is estimated as a cause of the malfunctioning elements specified in the malfunctioning elements specifying step, based on the representative values of the plurality of indicators, and the values of respective elements of the data to be analyzed; and an output step for outputting at least one of the malfunctioning elements specified in the malfunctioning elements specifying step and the indicator specified in the cause indicator specifying step.

(Supplementary Note 9)

A computer-readable recording medium recording a program which causes a computer to function as:

a malfunction-contribution degree calculator obtaining a malfunction-contribution degree, which indicates a degree that individual malfunctions (hereinafter, referred to as malfunctioning elements) contribute to a malfunctioning of an object being analyzed, based on a relative relationship between data to be analyzed of which elements have values generated based on values of a plurality of indicators for the object being analyzed, and representative values for the plurality of indicators corresponding to a plurality of malfunctions respectively;

a malfunctioning elements specifier specifying the malfunctioning elements being occurred, based on the malfunction-contribution degree obtained by the malfunction-contribution degree calculator;

a cause indicator specifier specifying, when a malfunction is occurred which is a combination of the malfunctioning elements, an indicator which is estimated as a cause of the malfunctioning elements specified by the malfunctioning elements specifier, based on the representative values of the plurality of indicators and the values of respective elements of the data to be analyzed; and an outputter outputting at least one of the malfunctioning elements specified by the malfunctioning elements specifier and the indicator specified by the cause indicator specifier.

This application is based on Japan patent application No. 2010-106810 filed on May 6, 2010. The entire disclosure of the specification, claims and drawings of the application is incorporated by reference herein.

INDUSTRIAL APPLICABILITY

The present invention is preferably applied to a usage which analyzes a malfunction of a mechanical system.

DESCRIPTION OF REFERENCE NUMERALS

100 Malfunction analysis apparatus
101 Inputter
102 Communicator
103 Controller
104 Memory
105 Outputter
106 Program
107 Malfunction-analysis processor
108 Attribute-extraction processor
110 Malfunction pattern matrix
111 Attribute pattern database
112 Malfunction pattern table
200 Malfunction analysis apparatus
205 Data matrix generation processor
206 Malfunction occurrence matrix generation processor
208 Data matrix
209 Malfunction occurrence matrix
300 Malfunction analysis apparatus
301 Data change degree calculation processor
302 Malfunction change pattern matrix
303 Malfunction change pattern database
304 Malfunction change pattern table
400 Malfunction analysis apparatus

The invention claimed is:

1. A malfunction analysis apparatus comprising:

a malfunction-contribution degree calculator configured to obtain a malfunction-contribution degree, which indicates a degree that individual malfunctions contribute to a malfunctioning of an object being analyzed, based on a relative relationship between data to be analyzed, of which elements are configured to have values generated based on values of a plurality of indicators for the object being analyzed, and representative values for the plurality of indicators corresponding to a plurality of malfunctions, respectively;

a malfunctioning elements specifier which is configured to specify malfunctioning elements currently occurring, based on the malfunction-contribution degree obtained by the malfunction-contribution degree calculator;

a cause indicator specifier configured to specify, when a malfunction involving a combination of malfunctioning elements occurs, an indicator which is estimated as a cause of the malfunctioning elements specified by the malfunctioning elements specifier, based on the representative values of the plurality of indicators and the values of respective elements of the data to be analyzed; and an outputter configured to output at least one of the malfunctioning elements specified by the malfunctioning elements specifier and the indicator specified by the cause indicator specifier the malfunction-contribution degree calculator includes:

a memory configured to store data to be analyzed, which stores the data to be analyzed, of which elements have the values generated based on the values of the plurality of indicators for the object being analyzed; and an obtainer configured to obtain the malfunction-contribution degree, which is configured to indicate the degree that individual malfunctions contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed stored in the memory for data to be analyzed, which are stored in advance, wherein the cause indicator specifier is configured to specify, when the malfunction involving a combination of malfunctioning elements occurs, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed, and a change degree calculator configured to obtain a degree of change of value of each indicator for the data to be analyzed; and a memory configured to store, as the data to be analyzed, the set of values which represents the degree of change obtained by the change degree calculator, wherein the value of each element of the malfunction pattern is a value representing the representative value of the degree of change for the value of each indicator corresponding to each malfunction, and the value of each element of the attribute pattern is a value representing the representative value of the degree of change for the value of each indicator corresponding to the combination of respective malfunctions.

2. The malfunction analysis apparatus according to claim 1, wherein the malfunction-contribution degree calculator includes:

a memory for data to be analyzed which is configured to store the data to be analyzed of which elements have the values generated based on the values of the plurality of indicators for the object being analyzed; and an obtainer configured to obtain the malfunction-contribution degree, which indicates the degree that malfunctioning elements contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed stored in the memory for data to be analyzed, which are stored in advance, wherein the cause indicator specifier is configured to calculate, when the malfunction involving a combination of malfunctioning elements occurs, values of the elements of an attribute pattern which represents the set of the representative values of the plurality of indicators based on representative values of the elements of a malfunction pattern, and specifies the indicator which is estimated as the cause of the malfunctioning elements specified by the malfunctioning elements specifier, based on the calculated values of the elements of attribute pattern, and the values of respective elements of the data to be analyzed stored in the memory for data to be analyzed.

3. The malfunction analysis apparatus according to claim 1, further comprising:

a data matrix generator configured to generate a first matrix from the data to be analyzed by arranging each indicator value of the data to be analyzed;

a data matrix memory configured to store the value of each element in each line of the first matrix generated by the data matrix generator as the data to be analyzed; and a malfunction occurrence matrix generator configured to generate a second matrix from the data to be analyzed by arranging presence or absence of malfunction occurrence to the data to be analyzed, wherein the malfunction-contribution degree calculator includes:

a malfunction pattern memory configured to store the value of each element of data in which the second matrix generated by the malfunction occurrence matrix generator and an unknown malfunction pattern representing representative values of the plurality of indicators corresponding to a plurality of malfunctions respectively are associated; and a calculator configured to calculate the malfunction-contribution degree and the values of the elements of the malfunction pattern, based on a relative relationship between corresponding values of the values of a plurality of elements of the data to be analyzed stored in the data matrix memory and the values of respective elements stored in the malfunction pattern memory, wherein the cause indicator specifier specifies, when the malfunction involving a combination of malfunctioning elements occurs, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed.

4. The malfunction analysis apparatus according to claim 1, further comprising:

a data matrix generator configured to generate a first matrix from the data to be analyzed by arranging each indicator value of the data to be analyzed;

a data matrix memory configured to store the value of each element in each line of the first matrix generated by the data matrix generator as the data to be analyzed; and a malfunction occurrence matrix generator configured to generate a second matrix from the data to be analyzed by arranging presence or absence of malfunction occurrence to the data to be analyzed, wherein the malfunction-contribution degree calculator includes:

a malfunction pattern memory configured to store the value of each element of data in which the second matrix generated by the malfunction occurrence matrix generator and an unknown malfunction pattern representing representative values of the plurality of indicators corresponding to a plurality of malfunctions respectively are associated; and a calculator configured to calculate the malfunction-contribution degree and the values of the elements of the malfunction pattern, based on a relative relationship between corresponding values of the values of a plurality of elements of the data to be analyzed stored in the data matrix memory and the values of respective elements stored in the malfunction pattern memory, wherein
    the cause indicator specifier calculates, when the malfunction involving a combination of malfunctioning elements occurs, values of the elements of an attribute pattern which represents the set of the representative values of the plurality of indicators based on values of the elements of a malfunction pattern, and specifies the indicator which is estimated as the cause of the malfunctioning elements specified by the malfunctioning elements specifier, based on the calculated values of the elements of the attribute pattern, and the values of respective elements of the data to be analyzed stored in the memory for data to be analyzed.

5. The malfunction analysis apparatus according to claim 1, wherein the memory for data to be analyzed is configured to store the values of the plurality of indicators of the object being analyzed as the data to be analyzed without any change.

6. The malfunction analysis apparatus according to claim 2, wherein the memory for data to be analyzed is configured to store the values of the plurality of indicators of the object being analyzed as the data to be analyzed without any change.

7. The malfunction analysis apparatus according to claim 3, wherein the memory for data to be analyzed is configured to store the values of the plurality of indicators of the object being analyzed as the data to be analyzed without any change.

8. The malfunction analysis apparatus according to claim 4, wherein the memory for data to be analyzed is configured to store the values of the plurality of indicators of the object being analyzed as the data to be analyzed without any change.

9. A malfunction analysis method comprising:
    a malfunction-contribution degree calculation step for obtaining a malfunction-contribution degree, which indicates a degree that individual malfunctions contribute to a malfunctioning of an object being analyzed, based on a relative relationship between data to be analyzed, of which elements are configured to have values generated based on values of a plurality of indicators for the object being analyzed, and representative values for the plurality of indicators corresponding to a plurality of malfunctions respectively;
    a malfunctioning elements specifying step for specifying the malfunctioning elements currently occurring, based on the malfunction-contribution degree obtained in the malfunction-contribution degree calculation step;
    a cause indicator specifying step for specifying, when a malfunction involving a combination of malfunctioning elements occurs, an indicator which is estimated as a cause of the malfunctioning elements specified in the malfunctioning elements specifying step, based on the representative values of the plurality of indicators, and the values of respective elements of the data to be analyzed;
    an output step for outputting at least one of the malfunctioning elements specified in the malfunctioning elements specifying step and the indicator specified in the cause indicator specifying step;
    the malfunction-contribution degree calculation step including:
        storing data to be analyzed, which stores the data to be analyzed, of which elements have the values generated based on the values of the plurality of indicators for the object being analyzed; and
        obtaining the malfunction-contribution degree, which indicates the degree that individual malfunctions contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed are stored for data to be analyzed, being stored in advance,
    wherein the cause indicator specifying step is configured to specify, when the malfunction involving a combination of malfunctioning elements occurs, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed, and
    a change degree calculation step for obtaining a degree of change of value of each indicator for the data to be analyzed; and
    storing, as the data to be analyzed, the set of values which represents the degree of change obtained by the change degree calculator,
    wherein
        the value of each element of the malfunction pattern is a value representing the representative value of the degree of change for the value of each indicator corresponding to each malfunction, and
        the value of each element of the attribute pattern is a value representing the representative value of the degree of change for the value of each indicator corresponding to the combination of respective malfunctions.

10. A non-transitory computer-readable recording medium recording a program which causes a computer to function as:
    a malfunction-contribution degree calculator configured to obtain a malfunction-contribution degree, which indicates a degree that individual malfunctions contribute to a malfunctioning of an object being analyzed, based on a relative relationship between data to be analyzed, of which elements are configured to have values generated based on values of a plurality of indicators for the object being analyzed, and representative values for the plurality of indicators corresponding to a plurality of malfunctions respectively;
    a malfunctioning elements specifier which is configured to specify the malfunctioning elements currently occurring, based on the malfunction-contribution degree obtained by the malfunction-contribution degree calculator;
    a cause indicator specifier which is configured to specify, when a malfunction involving a combination of malfunctioning elements occurs, an indicator which is estimated as a cause of the malfunctioning elements specified by the malfunctioning elements specifier, based on the representative values of the plurality of indicators and the values of respective elements of the data to be analyzed;
    an outputter configured to output at least one of the malfunctioning elements specified by the malfunctioning elements specifier and the indicator specified by the cause indicator specifier;
    the malfunction-contribution degree calculator including:
        a memory configured to store data to be analyzed, which stores the data to be analyzed, of which elements have the values generated based on the values of the plurality of indicators for the object being analyzed; and
        an obtainer configured to obtain the malfunction-contribution degree, which is configured to indicate the degree that individual malfunctions contribute to the malfunctioning, based on a relative relationship between corresponding values of representative values of the elements of a malfunction pattern which represents representative values for the plurality of indicators corresponding to a plurality of malfunctions respectively, and values of the elements of the data to be analyzed stored in the memory for data to be analyzed, which are stored in advance, wherein the cause indicator specifier is configured to specify, when the malfunction involving a combination of malfunctioning elements occurs, the indicator which is estimated as the cause of the malfunctioning elements specified by the malfunctioning elements specifier, based on values of the elements of an attribute pattern, which are stored in advance and represents a set of the representative values of the plurality of indicators, and the values of respective elements of the data to be analyzed stored in the memory for data to be analyzed, and a change degree calculator configured to obtain a degree of change of value of each indicator for the data to be analyzed; and a memory configured to store, as the data to be analyzed, the set of values which represents the degree of change obtained by the change degree calculator, wherein the value of each element of the malfunction pattern is a value representing the representative value of the degree of change for the value of each indicator corresponding to each malfunction, and the value of each element of the attribute pattern is a value representing the representative value of the degree of change for the value of each indicator corresponding to the combination of respective malfunctions.

* * * * *